Aug. 31, 1965  J. H. JOHNSON  3,204,141
ELECTRON GUN
Filed Aug. 20, 1962  2 Sheets-Sheet 1

INVENTOR
JAY H. JOHNSON

BY Watson, Cole, Grindle & Watson
ATTORNEYS

Aug. 31, 1965

J. H. JOHNSON 3,204,141

ELECTRON GUN

Filed Aug. 20, 1962

INVENTOR
JAY H. JOHNSON

BY Watson, Cole, Grindle & Watson

ATTORNEYS

United States Patent Office 3,204,141
Patented Aug. 31, 1965

3,204,141
ELECTRON GUN
Jay H. Johnson, Owensboro, Ky., assignor to Kentucky Electronics, Inc., Owensboro, Ky., a corporation of Kentucky
Filed Aug. 20, 1962, Ser. No. 217,790
4 Claims. (Cl. 313—337)

This invention relates to electronic discharge devices, such as the cathode ray electron tube, and more particularly to the electron gun structure comprised of an improved cathode assembly, control grid, and screen grid particularly adapted for use in the cathode ray electron tube and other electron discharge devices.

A conventional type of cathode ray tube has an electron gun structure consisting principally of a heated tubular cathode that acts as the source of electrons, a control grid, a screen grid, and other electrodes which serve to focus or deflect the electron beam emitted from the cathode. These electrodes are axially spaced along the electron gun. The conventional cathode is a cylindrical sleeve of nickel or other high-emission metal mounted through the center of an annular ceramic disc. The cathode is attached to the disc by flanged rings slipped over each end of the cathode and welded to the cathode sleeve in abutment to the ceramic or by beading the cathode sleeve on each side of the ceramic disc. As conventionally mounted in the ceramic disc, the outer circumference of the cathode sleeve is flush with the center opening of the ceramic disc through the entire thickness of the ceramic.

The tubular cathode electrode is enclosed at one end with a cap or is formed in an elongated cup shape so as to be closed at one end. The closed end is a flat surface upon which is deposited a coat of alkaline earth metal oxides to provide the emitting surface of the cathode when heated by an enclosed metal filament to the proper temperature. The emitting surface of the cathode is axially spaced from the control grid by a critical distance within a very small tolerance. The cathode to control grid spacing is accomplished by use of metal or ceramic spacers.

Although the principal electron-emitting surface of the cathode is the flat end cap or surface, the entire outside surface of the cathode sleeve emits electrons to some degree. This latter emission has been the cause of a buildup of minute particles of matter on the ceramic disc mounting the cathode sleeve. This deposit resulting from electron emission eventually becomes a path for leakage between the cathode and the control grid, or first grid. This leakage may occur on either side of the ceramic disc. Conventionally, to break the continuity of the electron deposit on said ceramic disc, the practice has been to form each side of the disc with a circular trench between the outer circumference of the disc and the center hole, at a distance from the center which would prevent the electron emission from the cathode, traveling a straight line, from hitting the inner wall and a portion of the bottom of the trench. Even though the innermost wall and corner of the bottom of the trench are thus protected by the inner lip of the trench from the deposit of particles by direct straight-line emission from the cathode, a small number of the electrons striking the outermost wall of the trench are reflected against the other surfaces of the trench and tend over a period of time to build up a leakage path.

In order to prevent a similar leakage path between the stem leads which are sealed through the glass stem because of deposit of particles emitted from the end of the surface of the cathode sleeve nearest the glass stem, it has been the practice to crimp onto the stem leads metal shields or umbrellas which prevent the deposit of particles on the glass stem beads immediately around the stem leads.

It is an object of this invention to provide, in a structure of the cathode and ceramic disc assembly, means for controlling thermal expansion of the cathode. This arrangement provides greater stability of the critical spacing between the effective surfaces of the cathode and the control grid through control of the amount and flow of the heat in the cathode structure.

It is a further object of this invention to provide an improved structure of the cathode and ceramic disc assembly having less heat loss through conduction from the cathode to the ceramic disc spacer, thus permitting the cathode to quickly reach operating temperature.

It is a further object of this invention to provide a structure of the cathode and ceramic disc assembly for preventing the deposit of leakage paths between the cathode and control grid or between base pins of the cathode ray tube.

It is a still further object of this invention to provide a cathode and ceramic disc structure of improved design which will permit the discard of the cathode sleeve only, rather than the entire cathode assembly, when a defective coating of the cathode emitting surface is found during assembly.

It is a further object of this invention to provide a control grid structure which will permit the accurate spacing of the surface of said grid with respect to the surface of the cathode.

It is a further object of this invention to provide an improved control grid structure and a screen grid structure for preventing thermal expansion from varying the critical spacing between the effective surfaces of the cathode, control grid and screen grid.

It is a still further object of this invention to provide an improved structure of cathode, control grid, and screen grid assembly for a low-drive cathode ray tube.

Briefly, this novel electron gun assembly includes a cathode, first and second grids, and is suitable for a low-voltage, low-current, transistor-operated television picture tube. A low-voltage tube requires closer spacing of the cathode and grid surfaces of the electron gun, and the closer spacing in turn greatly increases the importance of stability of the spacing. The problem of stability of spacing is not, however, confined to low-voltage tubes. Furthermore, this novel gun incorporates features which enable operation of the gun with greatly reduced current drain. One of these features is the method of mounting the cathode sleeve cylinder and base sleeve in the ceramic disc insulator whereby there is a minimal physical thermal contact between the metal cathode structure and the ceramic insulator disc structure and thereby less heat transfer or loss from the cathode to the disc.

Another feature is the smaller beam apertures in the grids which reduce the size of the beam and the power needed to form and accelerate it. The smaller grid apertures also have the very significant incidental benefit of providing a more well-defined picture through means of the sharper beam of electrons striking the face of the picture tube.

A thinner effective surface is needed on both grids in order to provide the closer spacing and smaller grid apertures necessary for a transistor-operated, low-power television set. In the subject electron gun these surfaces are much thinner than those heretofore used. Conventionally, the walls of the grid structure are about .010-inch thick in order to provide a stable support for the effective surface. One existing method for providing a thinner effective surface is to coin the effective area immediately surrounding the grid aperture to a thinner wall thickness.

The grid of the subject gun may have wall thickness of as low as .001±.00025 which will provide a uniform end wall of that thickness. By reducing the material thickness, the tolerance on the material is reduced 50 percent which results in a more uniform wall thickness. The uniform thinness of the end wall is advantageous for closer spacing between electrodes. This grid may be fabricated from the thinner material with sufficient structural rigidity because of the corrugation around the conical surface.

Thermal stability of the grid structure is provided by the lancing around the end wall with four small equidistant lance webs which permits horizontal thermal expansion in the direction of least resistance and thereby prevents bowing of the end wall due to thermal expansion. This lanced grid structure also permits heat flow from the area which would otherwise be enclosed by the grid.

The lancing also permits accurate spacing between the end wall of the first grid and the coated surface of the cathode upon assembly by the insertion and withdrawal of a precision spacer gauge.

Another feature is the corrugated surface of the grid which provides a greater surface area and, therefore, a means of greater thermal radiation. It also provides gaps where the frustoconical structure is secured to the cylindrical portion of the first grid, allowing heat flow out of the area which would otherwise be enclosed by the first grid between the end wall of the first grid and the cathode ceramic disc. Further, the corrugated surface of the grid provides structural rigidity to resist movement of the end wall due to thermal expansion.

Still another feature is the temperature control of the cathode which is provided by the use of the base cathode sleeve as a heat sink with control of the cathode temperature by means of the length and thickness of the base sleeve, alloy material used in the base sleeve, coating of base sleeve as by carbonizing, or by addition of flanges, ribs, grooves, or dimples to the base sleeve; and the reduced heat loss, through conduction from the cathode to ceramic disc, resulting from the minimal thermal contact between ceramic disc and cathode.

These and various other objects and features of the invention will be more clearly understood from a reading of the detailed description in conjunction with the drawing in which.

Figure 1:
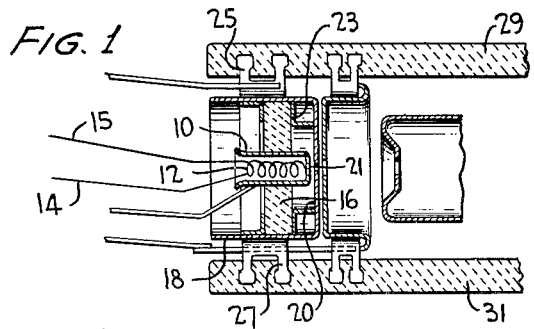
FIG. 1 is a view in section of a known electron gun including cathode, control grid, and screen grid.

Referring now to FIG. 1, there is depicted a view in section of the known type of electron gun assembly. In this assembly, a cathode 10 contains a coil heater wire 12 connected by suitable leads 14 and 15. Surrounding the cathode 10 is a ceramic disc 16 which is a form of high temperature insulation well known in the art. A cylindrical member 18 encircles the ceramic disc 16 and has an end wall 20 defining a grid which is substantially parallel and axially aligned with the emitting surface 21 of the cathode 10. A metal spacer member 23, which is preferably in the form of an annular ring, maintains a predetermined spacing between the ceramic ring 16 and the grid 20. Cylinder 18 is supported in the gun assembly by means of straps 25 and 27 which depend from support rods 29 and 31. This prior art assembly exhibited numerous disadvantages, such as the formation of a short-circuit path between the cathode 10 and the metal spacer 23 by depositing conducting material from the cathode across the surface of the ceramic disc 16. Similar problems occurred on the opposite surface of the ceramic disc as a result of emission from the lower surface of the cathode which often deposited a short-circuit path between the end of the cathode remote from the emitting surface 21 and thus, short-circuited the cathode 10 to the cylinder 18. Further, while the ceramic disc 16 is an insulating material, it constitutes a heat conductor to conduct heat away from the cathode 10 and thus, increases the warm-up time for the cathode which represents an undesirable delay when the gun assembly is employed as in the picture tube of a television set.

Figure 2:
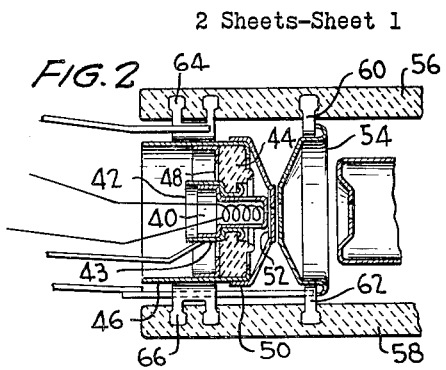
FIG. 2 is a view in section of one illustrative embodiment of this invention.

Referring now to FIG. 2, there is depicted one illustrative embodiment of this invention in which the cathode 40 is supported by a cathode base sleeve 42, which base sleeve contacts ceramic disc 44 in a very limited surface area contact to reduce the heat transfer from the cathode to the ceramic disc 44 which was normally experienced in the prior art device, as explained above. The ceramic disc is enclosed by a cylindrical member 46 and the disc 44 is held in position by means of an annular ring 48 which is joined to the cylinder 46 by any convenient means, such as by brazing. Advantageously, the base sleeve 40 is fabricated from a non-emitting or low-emitting material, or the outer surface of the base sleeve is coated with a non-emitting material to prevent the deposit of short-circuiting paths across the adjacent surface of the ceramic ring 44. A first grid 50 engages the outer surface of cylinder 46 and has a surface 52 substantially parallel to the cathode emitting surface. This first grid is corrugated except for surface 52 and has one or more small apertures to permit the passage of electrons therethrough. A second grid 54 is a combination cylindrical and frustoconical structure and is corrugated similar to the first grid with the conical portions of the two grids facing in opposite directions. Grid 54 is supported from support rods 56 and 58 by means of supporting straps 60 and 62. Similarly, cylinder 48 is supported from support rods by means of straps 64 and 66. The corrugated frustoconical surfaces increase structural rigidity of both grid members, allowing the effective surfaces to be made out of extremely thin and uniformly thin material permitting closer spacing and smaller apertures. On grid 50 it also increases heat radiation.

Figure 3:
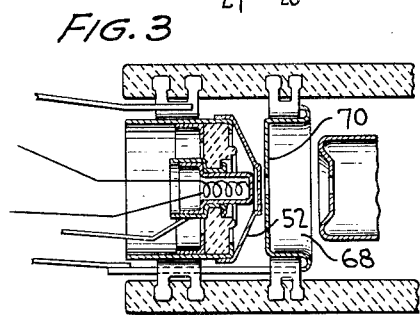
FIG. 3 is a view in section of another illustrative embodiment of this invention.

Referring now to FIG. 3, there is depicted another illustrative embodiment of this invention in which the assembly of the cathode, cathode disc, ceramic ring and first grid is identical to that of FIG. 2. The second grid 68, however, is a cylindrical member with an end wall 70 substantially parallel to the adjacent surface of the first grid 52.

Figure 4:
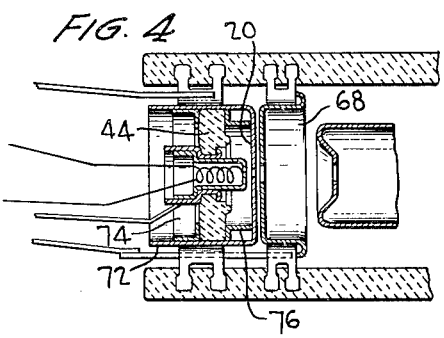
FIG. 4 is a view in section of another illustrative embodiment of this invention.

Referring now to FIG. 4, there is depicted a view in section of another illustrative embodiment of this invention. In this embodiment, the cathode-cathode base sleeve and ceramic ring are identical to FIG. 2. The cylinder 72 encircles the ceramic ring 44 and the ceramic ring 44 is retained in position by a suitable annular ring 74 secured to the sleeve 72 by any convenient means, such as by brazing or welding. On the opposite side of the ceramic disc 44 from the annular ring 74, a spacer 76 is positioned to maintain a predetermined spacing between the disc 44 and the first grid 20. The second grid 68 is identical with that shown in FIG. 3.

Figure 5:
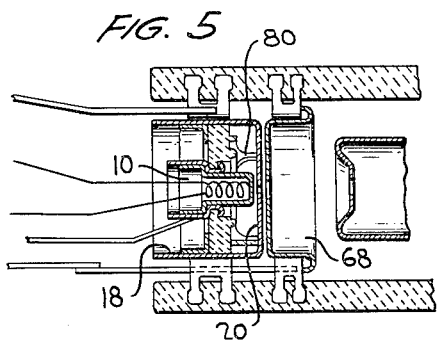
FIG. 5 is a view in section of still another illustrative embodiment of this invention.

Referring now to FIG. 5, there is depicted a view in section of still another illustrative embodiment of this invention. In this embodiment, the arrangement of the cathode base sleeve and ceramic disc is identical to that shown in FIGS. 2 through 4. In this embodiment, a ceramic spacing spider 80 is employed accurately to maintain the positioning of the first grid 20 relative to the cathode 10, while eliminating any possibilities of the build-up of a short-circuit path by the deposition of metal from the cathode to the cylindrical member 18. In this embodiment, the second grid 68 is identical to that shown in FIGS. 3 and 4.

Figure 6:
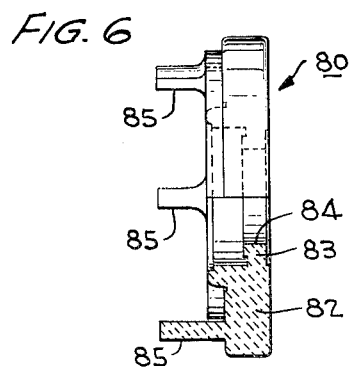
FIG. 6 is a view in section, to an enlarged scale, of a portion of the embodiment of FIG. 5.
Figure 7:
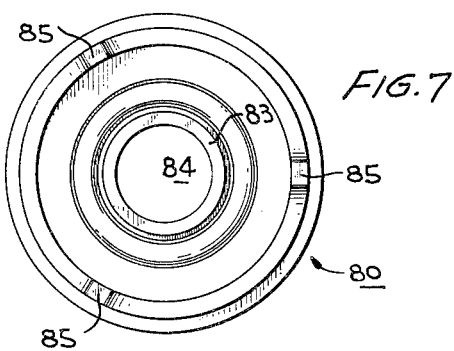
FIG. 7 is an end view of FIG. 6 taken in the direction of arrow 7—7.

Referring now to FIGS. 6 and 7, there is shown to an enlarged scale the ceramic spacer 80. The spacer includes a ceramic annular ring 82 having a reduced inturned flange 83 adjacent the aperture 84 and a plurality of arms 85 depending from one surface of the ring 82. In this particular instance, three arms are employed and they are positioned 120° apart. The ceramic ring is particularly advantageous as a spacing device because of its low thermal coefficient of expansion and further, because it is non-conducting and precludes the possibility of the build-up of a conducting path between the cathode and the cylinder 18.

Figure 8:
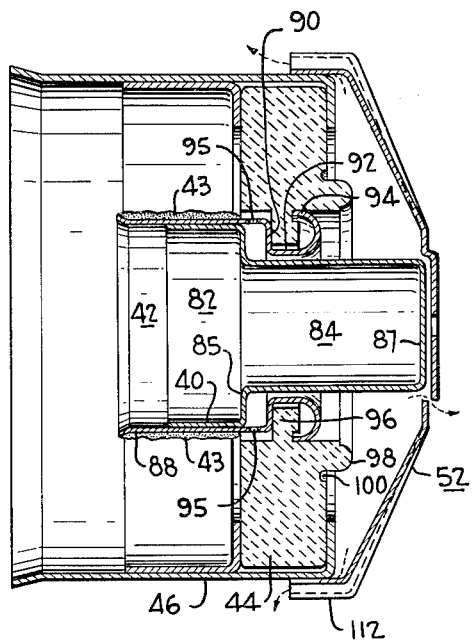
FIG. 8 is a view in section, to an enlarged scale, of a portion of one illustrative embodiment of this invention; and, FIG. 9 is an end view of FIG. 8.

FIG. 8 shows to an enlarged scale a portion of the gun assembly of FIGS. 2 and 3. It is to be noted that the cathode 40 has an enlarged cylindrical portion 82 and a reduced cylindrical portion 84 connected thereto by means of an inturned flange portion 85 and the reduced portion 84 terminates in a flat electron emitting end wall 87. The cathode base sleeve 42 is made of non-emitting or low-emitting material or has a non-emitting surface 43 on the enlarged cylindrical portion 88. The other end of the base sleeve has an inturned shoulder 90, a reduced cylindrical portion 92 and an out-turned lip 94. The combination of the shoulder 90 and the out-turned lip 94 engages the reduced inturned flange 96 of the ceramic ring 44. It is to be noted that aside from these limited cylindrical areas of contact between the base sleeve 42, the base sleeve is spaced from the ceramic ring 44. It is also to be noted that the reduced cylindrical portion 84 of the cathode 40 is spaced from the portion of the base sleeve 42 which engages ceramic ring 44. Thus, the conductive path for heat between the cathode 40 and the ceramic ring 44 is very limited. Consequently, the cathode may rapidly achieve a rise in temperature in response to the energization of the heater coil, not shown, thereby permitting emission from the emitting surface 87 in a minimum of time.

Advantageously, this gun assembly includes means for testing the spacing between grid 52 and cathode 84. This means includes holes such as 95 in the cathode base sleeve 42 above the shoulder of cathode 82. When the gun is assembled, a measured quantity of air is pressed through holes 95. This given flow of air assures that the spacing between grid 52 and cathode 84 is correct.

It is to be noted that the ceramic ring 44 has a ridge 98 and a valley 100 positioned in that order from the cathode to the supporting ring 46. Thus, it is practically impossible for metallic material to be deposited in a continuous path across the surface of the annular ceramic ring 44 to define a short circuit between the cathode and the support ring 46.

Figure 9:
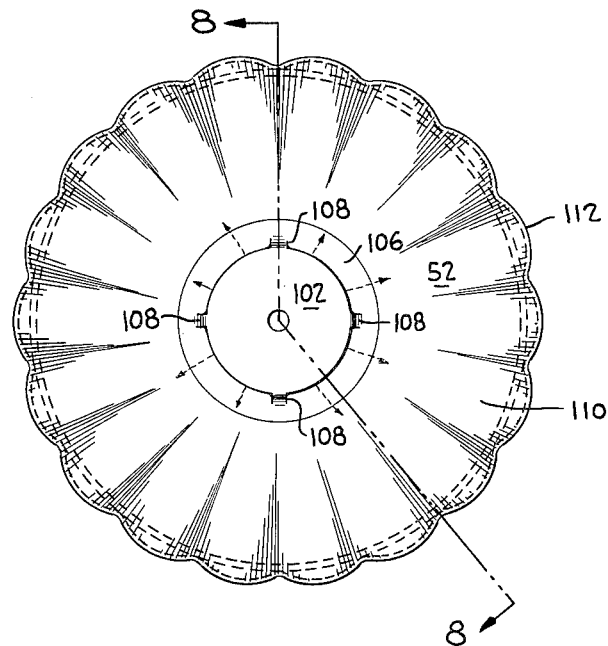

The first grid 52 has a flat surface portion 102 substantially parallel to the cathode emitting surface 87 and this flat cylindrical surface is raised or partially separated from a circular surface 106 by means of a plurality of spaced lancing or lacing webs 108. These lacing webs permit the escape of heat therebetween such that the heat from the cathode 40 may escape without causing undue expansion of the first grid 52. The frustoconical section 110 of the grid 52 has a corrugated surface which extends into the cylindrical section 112 as best seen in FIG. 9. The corrugated cylindrical portion 112 engages the supporting cylinder 46 only at spaced intervals, while providing a series of heat passages between these two members more adequately to ventilate the area around the cathode and thereby further reduce thermal expansion and movement of the members.

While I have shown and described certain illustrative embodiments of this invention, it is understood that the features thereof may be employed in other embodiments without departing from the spirit and scope of this invention.

What is claimed is:

1. An electron gun comprising in combination, a cathode assembly including an annular ceramic disc with a central aperture, a cathode sleeve assembly having an end portion mounted in said aperture comprising an inturned shoulder abutting the ceramic on one side and a deformed edge portion contacting the ceramic on the other side in a limited contact surface with the intermediate areas of the end portion spaced from the inner circumference surface of the ceramic ring, and a cathode cylinder affixed to said cathode sleeve on one side of said disc holding the cathode cylinder concentrically within said aperture with the cathode cylinder spaced from the said end portion of the sleeve.

2. A combination as defined in claim 1 wherein said ceramic disc has a portion of reduced thickness extending in the vicinity of said central aperture to serve as a recipient of said deformed edge portion.

3. A combination as defined in claim 1 wherein said cathode sleeve assembly has two contiguous cylindrical portions of different diameter.

4. A cathode assembly for an electron gun comprising in combination, an annular ceramic disc with a central aperture therein, a substantially cylindrical cathode base sleeve having one end affixed to said ceramic disc in said aperture and the other end extending significantly beyond one surface of the disc and comprising an enlarged cylindrical portion of larger diameter than said central aperture of the disc, a tubular cathode having a closed end wall at a small cylindrical end portion and a portion of enlarged diameter at its opposite end portion, said tubular cathode being mounted in said cathode base sleeve with the small end portion projecting concentrically through said aperture and the enlarged end portion having its wall in snug sliding engagement with the inner circumference surface of said enlarged cylindrical portion of the cathode base sleeve, the tubular cathode being spaced from said cathode base sleeve in the region of the aperture.

References Cited by the Examiner

UNITED STATES PATENTS

| 2,443,916 | 6/48 | Kelar | 313—82 |
| 2,582,454 | 1/52 | Pohle | 313—250 |
| 2,764,708 | 9/56 | Beck | 313—82 |
| 2,788,460 | 4/57 | Santis | 313—107 |
| 2,963,608 | 6/60 | Benda | 313—82 |
| 3,027,479 | 3/62 | Benway | 313—82 |

FOREIGN PATENTS 773,580   5/57   Great Britain.

JOHN W. HUCKERT, *Primary Examiner.*

JAMES D. KALLAM, *Examiner.*